United States Patent
Huang et al.

(10) Patent No.: US 8,619,226 B2
(45) Date of Patent: Dec. 31, 2013

(54) PIXEL STRUCTURE OF FRINGE FIELD SWITCHING MODE LCD

(75) Inventors: Jiun-jr Huang, Dongshan Township (TW); Hsu-ping Chiu, Zhongli (TW); Shih-fong Huang, Puli Township (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 33 days.

(21) Appl. No.: 13/310,700

(22) Filed: Dec. 2, 2011

(65) Prior Publication Data

US 2013/0044285 A1    Feb. 21, 2013

(30) Foreign Application Priority Data

Aug. 17, 2011    (TW) .............................. 100129433 A (51) Int. Cl.
G02F 1/1343    (2006.01)
G02F 1/1333    (2006.01)

(52) U.S. Cl.
USPC .......................... 349/141; 349/138; 349/139

(58) Field of Classification Search
USPC .......................... 349/141, 138, 139; 345/103
See application file for complete search history.

(56) References Cited

U.S. PATENT DOCUMENTS

| | | | |
|---|---|---|---|
| 2002/0180900 A1* | 12/2002 | Chae et al. | 349/43 |
| 2002/0180920 A1* | 12/2002 | Noh et al. | 349/141 |
| 2004/0124414 A1* | 7/2004 | Jang et al. | 257/59 |
| 2005/0030465 A1* | 2/2005 | Park et al. | 349/149 |
| 2007/0160778 A1* | 7/2007 | Matsumori et al. | 428/1.2 |
| 2007/0222907 A1* | 9/2007 | Onogi et al. | 349/42 |
| 2007/0242204 A1* | 10/2007 | Fujita et al. | 349/141 |
| 2009/0096949 A1* | 4/2009 | Cho et al. | 349/43 |
| 2009/0115951 A1 | 5/2009 | Jun et al. | |
| 2009/0323005 A1 | 12/2009 | Ota | |
| 2010/0079694 A1* | 4/2010 | Yoshida et al. | 349/40 |

FOREIGN PATENT DOCUMENTS

| | | |
|---|---|---|
| CN | 101620346 A | 1/2010 |
| CN | 101995705 A | 3/2011 |
| CN | 102087450 A | 6/2011 |

* cited by examiner

*Primary Examiner* — Bumsuk Won
*Assistant Examiner* — Jia Pan
(74) *Attorney, Agent, or Firm* — Cheng-Ju Chiang (57) ABSTRACT

A pixel structure of a fringe field switching (FFS) mode LCD is provided, and the pixel structure includes: a scan line, a thin film transistor (TFT), a common electrode, a pixel electrode, and a patterned insulative layer. The pixel electrode is insulatively disposed on the common electrode. The pixel electrode generates a fringe field corresponding to the common electrode. The patterned insulative layer, which is disposed above the scan line and the TFT, is utilized to confine the fringe field so as to reduce disordered electrical field, thereby improving the shortcoming of light leakage.

9 Claims, 8 Drawing Sheets

PIXEL STRUCTURE OF FRINGE FIELD SWITCHING MODE LCD

TECHNICAL FIELD OF THE INVENTION

The present invention relates to a pixel structure of a liquid crystal display (LCD), especially to a pixel structure of a fringe field switching (FFS) mode LCD.

BACKGROUND OF THE INVENTION

In comparison with cathode ray tube (CRT) displays, poor viewing angle performance is a major shortcoming in conventional LCD displays. In order to solve this problem, In-Plane Switching (IPS) mode LCDs and FFS mode LCDs have been developed. A common electrode and a pixel electrode of the IPS mode LCD are disposed on a same substrate, and a horizontal electric field, which is formed between the common electrode and the pixel electrode, is utilize to twist liquid crystal molecules in a plane. The viewing angle performance of the IPS mode LCD can be significantly improved, but an aperture ratio thereof is low since the common electrode and the pixel electrode are disposed on the same substrate.

The disposal scheme of the electrodes in the IPS mode LCD is improved in the FFS technology, the common electrode of an opaque metal in the IPS mode LCD is replaced by a transparent common electrode, which is made as board-like, for increasing a transmittance to overcome the shortcoming of the low aperture ratio. Moreover, unlike that positive and negative electrodes of the IPS mode LCD are arranged apart, positive and negative electrodes of the FFS mode LCD are arranged overlapped with an insulative layer sandwiched therebetween so that widths of the electrodes and an interval therebetween can be greatly reduced. This design allows the distribution of the electric field to be more intensive.

Figure 1:
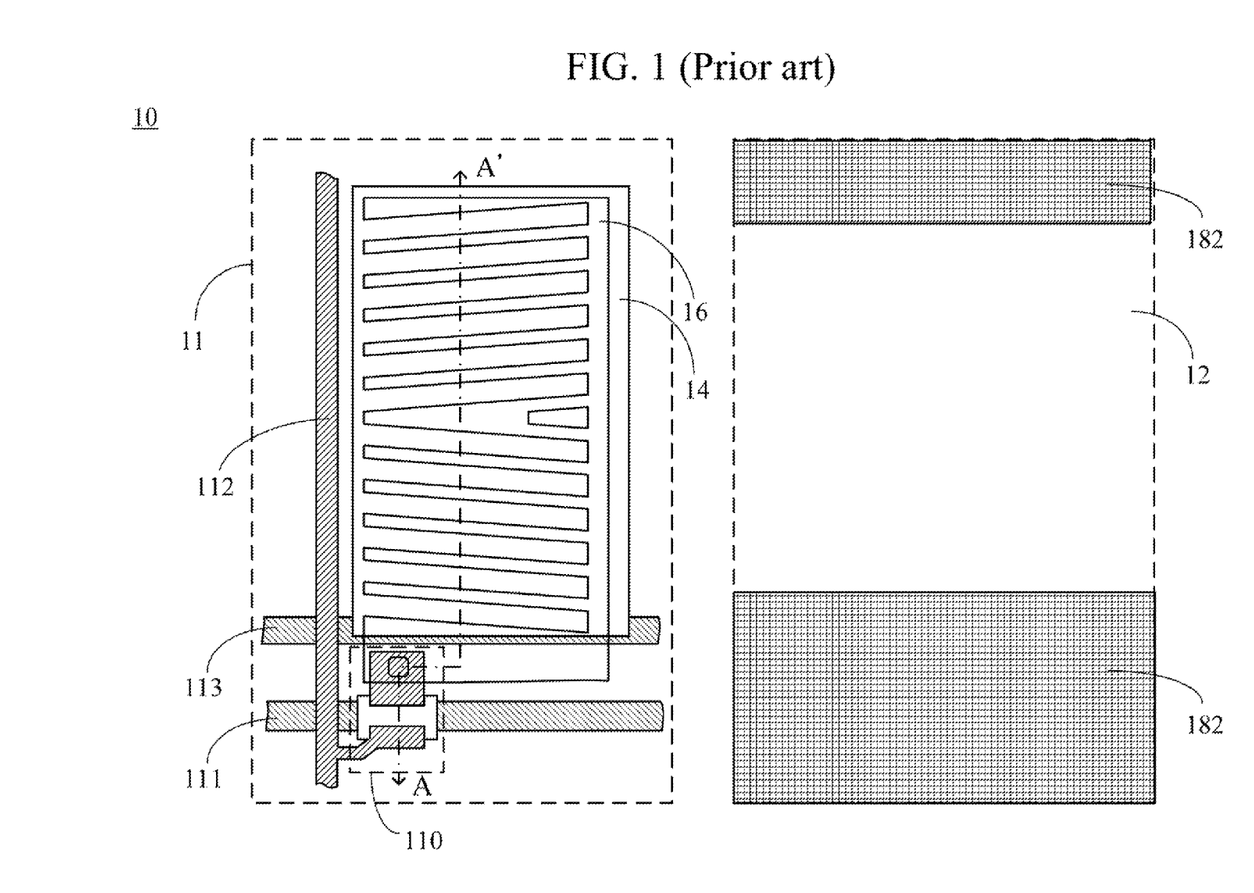
FIG. 1 is a top view schematically illustrating a pixel structure of an FFS mode LCD in prior art.
Figure 2:
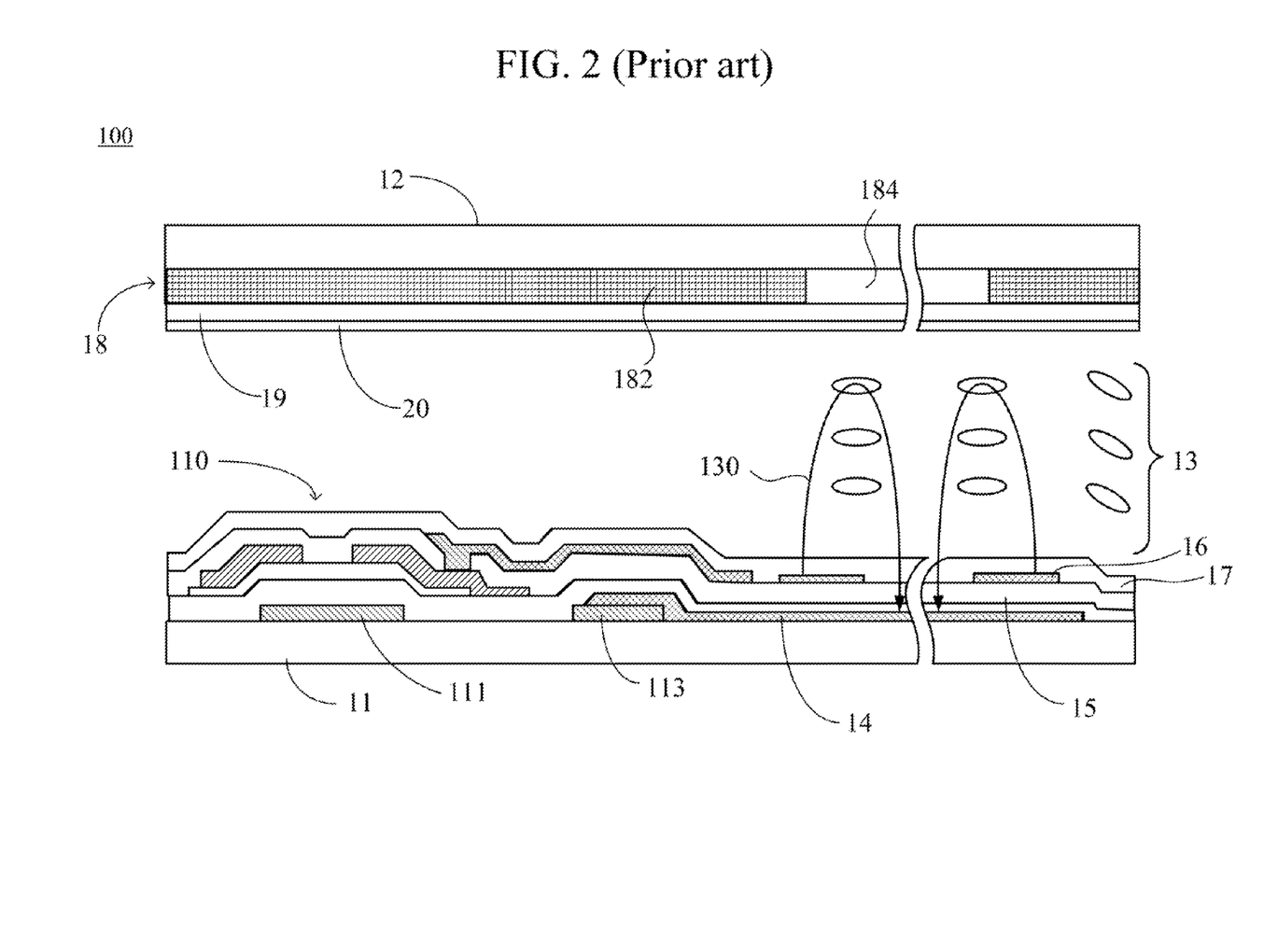
FIG. 2 is a schematic cross-sectional diagram along a line A-A' in FIG. 1.

Referring to FIG. 1 and FIG. 2, FIG. 1 is a top view schematically illustrating a pixel structure of an FFS mode LCD in prior art, and FIG. 2 is a schematic cross-sectional diagram along a line A-A' in FIG. 1. The pixel structure of FFS mode LCD 10 includes a first substrate 11, a second substrate 12, and a liquid crystal layer 13 is sandwiched between the first substrate 11 and the second substrate 12. A common electrode 14, an insulative layer 15, a pixel electrode 16, and a first alignment film 17 are sequentially laminated on a side of the first substrate 11 which is adjacent to the liquid crystal layer 13. A color layer 18, a protective layer (overcoating) 19, and a second alignment film 20 are sequentially disposed on a side of the second substrate 12 which is adjacent to the liquid crystal layer 13. The protective layer 19 herein is utilized to avoid a height difference being generated between a black matrix (BM) 182 and a chromatic photoresist 184 in the color layer 18, that is, to planarize the whole surface thereof for facilitating the second alignment film 20 to be coated smoothly.

As shown in FIG. 1, a plurality of scan lines 111, data lines 112 and storage capacitor electrodes 113 are disposed on the first substrate 11. The scan lines 111 insulatively intersect the data lines 112 to define a plurality of pixel units (not shown). Thin film transistors (TFTs) 110 are disposed in the intersection regions of the scan lines 111 and the data lines 112. The pixel electrode 16 overlaps the common electrode 14 in each pixel unit, the pixel electrode 16 is a comb-like structure, and the common electrode 14 is a board-like structure. When no voltage is applied to the pixel electrode 16, the liquid crystal molecules are arranged along an alignment direction, that is, a direction parallel to the scan lines 111.

As shown in FIG. 2, when a voltage is applied to the pixel electrode 16, a fringe field 130 is generated between the pixel electrode 16 and the common electrode 14, and the liquid crystal molecules are twisted in a plane due to the action of the fringe field. The liquid crystal molecules are twisted to a direction that is perpendicular to slits of the comb-like structure of the pixel electrode 16 as shown in FIG. 1, thereby controlling backlight outgoing.

However, when there is no voltage applied to the pixel electrode 16, the backlight is unable to pass through the liquid crystal layer 13 in theory. Actually, the first alignment film 17, which covers over the TFT 110, the storage capacitor electrode 113, as well as edges of the pixel electrode 16, is not even and has some height differences thereon, such that the alignment direction of the liquid crystal molecules on those regions is not completely horizontal. Therefore, there is light leakage occurring in those regions. In addition, an electrical field in those regions is not the same as the fringe field 130 shown in FIG. 2, but is a disordered electrical field which can cause incorrect image display.

In order to solve said drawbacks in the prior art, the opaque black matrix 182 is disposed in the color layer 18 on the second substrate 12, thereby shielding the light leakage in those regions. Moreover, the light leakage can be shielded by increasing areas of metal material on the first substrate 11. However, every one of the above-mentioned methods has a shortcoming that the aperture ratio of the panel is reduced.

SUMMARY OF THE INVENTION

Accordingly, an objective of the present invention is to provide a pixel structure of a fringe field switching (FFS) mode LCD. The pixel structure can solve the drawback of light leakage in the prior art, and the area of the black matrix can be reduced, even further omitting the black matrix, thereby increasing aperture ratio of the panel.

To achieve the foregoing objective, according to an aspect of the present invention, the pixel structure of the FFS mode LCD of a preferred embodiment of the present invention includes a first substrate, a scan line, a data line, a thin film transistor (TFT), a common electrode, a pixel electrode, and a patterned insulative layer. The scan line is disposed on the first substrate. The data line is insulatively intersecting the scan line to define a pixel unit. The TFT is disposed in an intersection region of the data line and the scan line. The common electrode is disposed in the pixel unit on the first substrate. The pixel electrode is disposed above the common electrode and is insulated from the common electrode, and the pixel electrode generates a fringe field corresponding to the common electrode. The patterned insulative layer is disposed on the scan line and the TFT and exposes the pixel unit. The patterned insulative layer confines the fringe field within the pixel unit.

In one preferred embodiment, the TFT and the scan line are covered with the pixel electrode. In addition, the pixel electrode is partially covered with the patterned insulative layer. Preferably, the patterned insulative layer is made of silicon nitride or silicon oxide.

In one preferred embodiment, the pixel structure further includes a first alignment film covering the patterned insulative layer and the pixel electrode in the pixel unit. Preferably, the first alignment film is a photo-alignment film.

In one preferred embodiment, the pixel structure further includes a patterned reflective layer. The patterned reflective layer is disposed on the patterned insulative layer. Preferably, the patterned reflective layer is made of metal.

It is worth mentioning that the pixel structure further includes a second substrate which is disposed opposite to the first substrate, and a liquid crystal layer is sandwiched between the first substrate and the second substrate. More specifically, the pixel structure further includes a color layer and a second alignment film, which are sequentially disposed on a side of the second substrate which is adjacent to the liquid crystal layer.

In accordance with the pixel structure of the FFS mode LCD, the patterned insulative layer is utilize to confine the fringe field to reduce the disordered electrical field for improving the drawback of the light leakage. Moreover, a cover area of the pixel electrode can be increased, so the light leakage resulting from the disordered electrical field can be completely removed, thereby omitting the black matrix. Therefore, the aperture ratio is increased and the production costs are reduced.

It is to be understood that both the foregoing general description and the following detailed description of the present invention are exemplary and explanatory and are intended to provide further explanation of the invention as claimed.

DETAILED DESCRIPTION OF THE INVENTION

The specification of the present invention provides various embodiments to illustrate the technical features of the different implementation modalities of the present invention. The configuration of each component in the embodiments is utilized to clearly explain the contents of the present invention but not to limit the present invention. The same reference numerals refer to the same parts or like parts throughout the various figures, which do not mean the relationship between the various embodiments.

Figure 3:
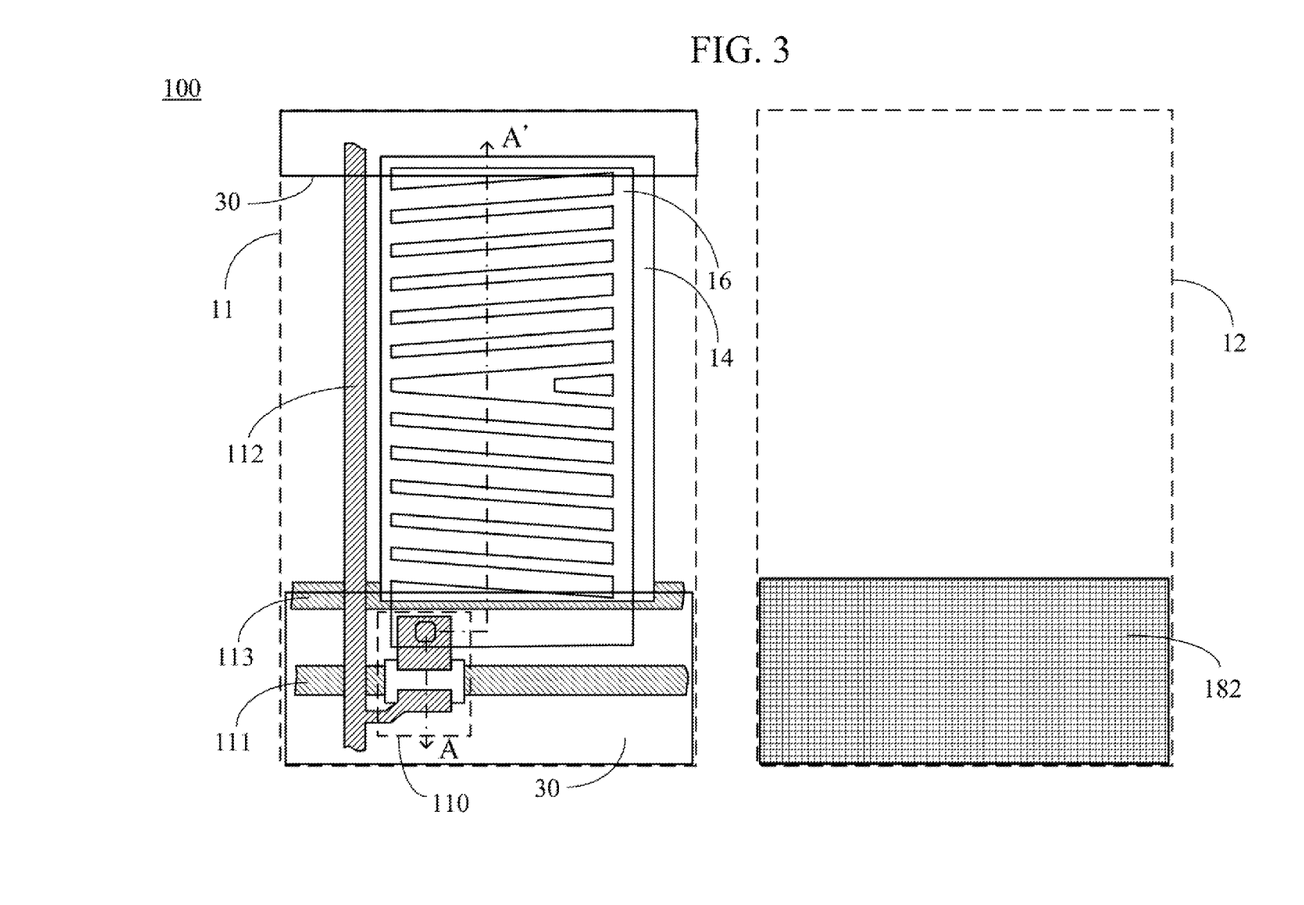
FIG. 3 is a top view schematically illustrating a pixel structure of a fringe field switching (FFS) mode LCD according to a first preferred embodiment of the present invention.
Figure 4:
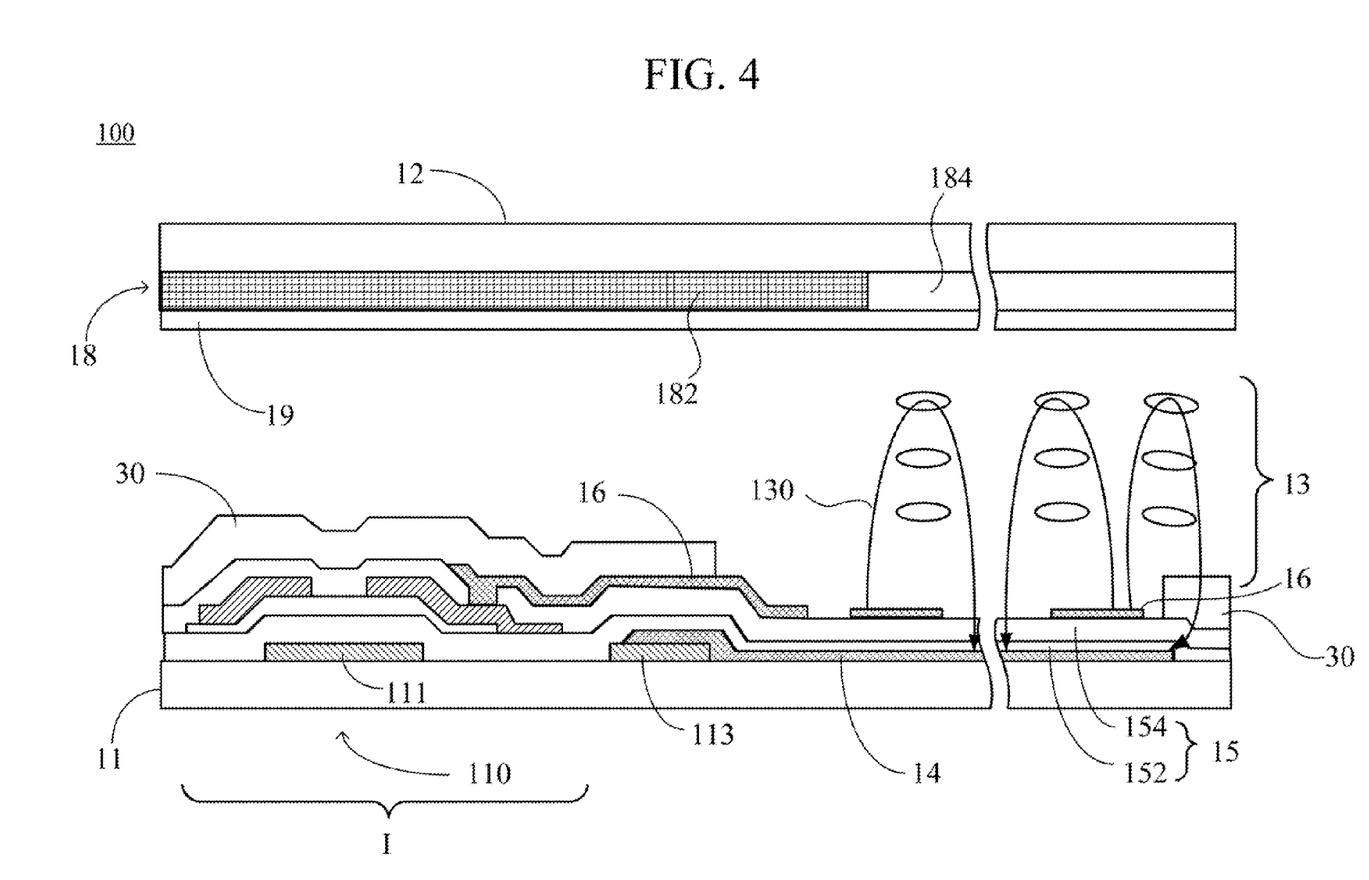
FIG. 4 is a schematic cross-sectional diagram along a line A-A' in FIG. 3.

Referring to FIG. 3 and FIG. 4, FIG. 3 is a top view schematically illustrating a pixel structure of a fringe field switching (FFS) mode LCD according to a first preferred embodiment of the present invention, and FIG. 4 is a schematic cross-sectional diagram along a line A-A' in FIG. 3. It should be noted that the drawings are not depicted as actual proportions. The pixel structure 100 of the FFS mode LCD includes a substrate, a scan line 111, a data line 112, a storage capacitor electrode 113, a TFT 110, a common electrode 14, a pixel electrode 16, and a patterned insulative layer 30, in which the substrate is designated as a first substrate 11 for clarify explanation. The pixel structure 100 further includes a second substrate 12 which is disposed opposite to the first substrate 11, and a liquid crystal layer 13 is sandwiched between the first substrate 11 and the second substrate 12.

The scan line 111 is disposed on the first substrate 11, and the data line 112 insulatively intersects the scan line 111. The data line 112 and the scan line 111 define a pixel unit (not shown). The TFT 110 is disposed in an intersection region of the data line 112 and the scan line 111. Specifically, the TFT 110 has a gate, a source, a drain, semiconductor layers, insulative layers, a contact hole, and so on which are well-known for a person skilled in the art, so no further detail will be provided herein.

The common electrode 14 is disposed in the pixel unit on the first substrate 11, and the common electrode 14 is partially electrically coupled to the storage capacitor electrode 113. Specifically, the common electrode 14 is a board-like structure. The pixel electrode 16 is disposed above the common electrode 14 and is insulated from the common electrode 14, and the pixel electrode 16 generates a fringe field 30 corresponding to the common electrode 14. The pixel electrode 16 is a comb-like structure. Specifically, there is an insulative layer 15 which is disposed between the pixel electrode 16 and the common electrode 14. Furthermore, the insulative layer 15 includes a gate insulative layer (GI layer) 152 and a contact hole layer 154 which are well-known for a person skilled in the art.

As shown in FIG. 3, The patterned insulative layer 30 is disposed on the scan line 111 and the TFT 110, and the pixel unit is exposed out. It is worth mentioning that the patterned insulative layer 30 is made of silicon nitride or silicon oxide. It should be noted that although the patterned insulative layer 30 is divided as two parts in FIG. 3, in fact, the fringe field switching (FFS) mode LCD consists of a plurality of pixel structures 100. Therefore, the upper patterned insulative layer 30 in FIG. 3 is coupled to another patterned insulative layer (equal to the lower patterned insulative layer 30 in FIG. 3) which is located in another pixel structure (not shown) above the pixel structure 100. As shown in FIG. 4, the patterned insulative layer 30 is utilized to confine the fringe field 130 within the pixel unit. Specifically, the fringe field 130 in edges of the pixel electrode 16 is pushed inwardly, so that a deformation of the fringe field 130 located on edges of the pixel unit is reduced. Accordingly, the twisted angles of liquid crystal molecules toward a vertical direction are reduced, so the light leakage is reduced.

In the first preferred embodiment, the pixel structure 100 further includes a first alignment film (not shown for clarity) covering the patterned insulative layer 30 and the pixel electrode 16 in the pixel unit. However, the first alignment film also has height differences. In order to solve this problem, the first alignment film can be a photo-alignment film, that is, an alignment film is made by a photo-alignment process. The photo-alignment film can cause optical anisotropy by using ultraviolet light for replacing conventional alignment film made by rub, thereby solving the problem of the height differences.

Referring to FIG. 1 and FIG. 3, after decreasing the deformation of the fringe field 130 in the edges of the pixel unit, the light leakage at an upper region of the pixel structure 100 in FIG. 3 can be decreased. Therefore, the area of black matrix 182 on the second substrate can be decreased, thereby increasing the aperture ratio of the FFS mode LCD.

Figure 5:
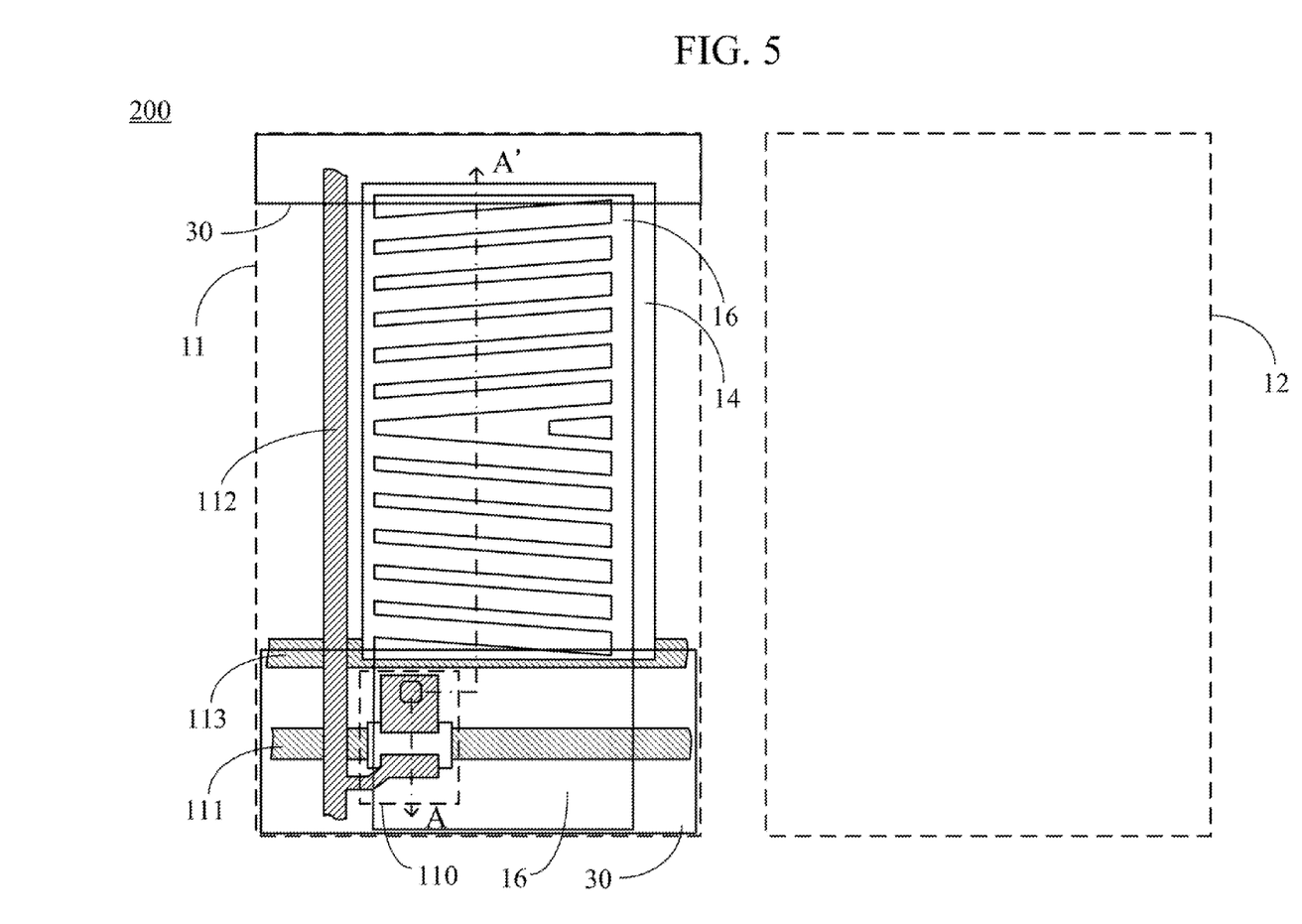
FIG. 5 is a top view schematically illustrating a pixel structure of an FFS mode LCD according to a second preferred embodiment of the present invention.
Figure 6:
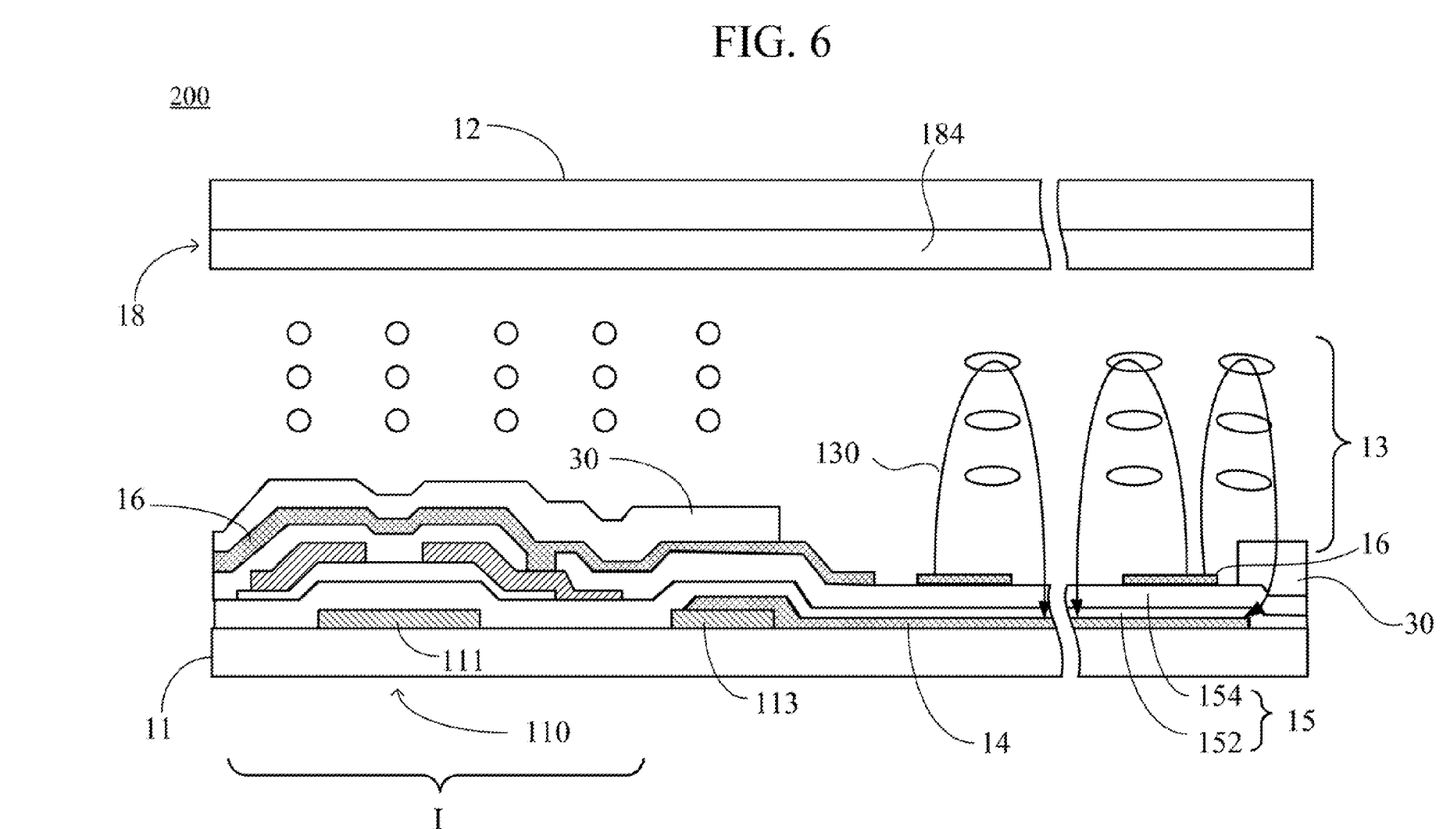
FIG. 6 is a schematic cross-sectional diagram along a line A-A' in FIG. 5.

A second preferred embodiment of the present invention will be explained in the following. Referring to FIG. 5 and FIG. 6, FIG. 5 is a top view schematically illustrating a pixel structure of an FFS mode LCD according to a second preferred embodiment of the present invention, and FIG. 6 is a schematic cross-sectional diagram along a line A-A' in FIG. 5. The pixel structure of the FFS mode LCD according to the second preferred embodiment of the present invention is designated as a reference numeral 200.

The difference between the second embodiment and the first embodiment is that the pixel electrode 16 is covered on the TFT 110 and the scan line 111, that is, the pixel electrode 16 is extended to a component area I. In addition, the patterned insulative layer 30 is partially covered on the pixel electrode 16, and the pixel unit is exposed outside the patterned insulative layer 30. The descriptions of other elements have been explained as above mention.

Because the pixel electrode 16 is covered on the component area I without gaps, the pixel electrode 16 can not form the fringe field within the component area I. That is, there is no disordered electrical field to occur. It can be seen from the foregoing that the liquid crystal molecules are not twisted on the component area I, and the arranging direction thereof is still an original alignment direction, thereby removing the light leakage on the component area I.

Referring to FIG. 6 and FIG. 4, because the light leakage of the component area I has been removed, the black matrix 182 on the second substrate can also be removed for obtaining the maximum aperture ratio. In addition, referring to FIG. 6, because the black matrix 182 is removed, that is, the black matrix that is made of Cr or resin does not have to be disposed in the color layer 18, the color layer 18 is all the chromatic photoresist 184 without height differences. Thus, the protective layer 19 does not have to be disposed thereon, such that the second alignment film (not shown) can be disposed on the color layer 18 directly. It is worth mentioning that the transmittance of light can increase 1.1 times in the FFS mode LCD of the second embodiment without disposing the protective layer.

It should be noted that the resistance and capacitance delay (RC delay) is increased due to the pixel electrode 16 being covered on the component area I, but it can be compensated by changing a width and length ratio (W/L) of the TFT 110 and increasing the storage capacitor electrode 113.

Figure 7:
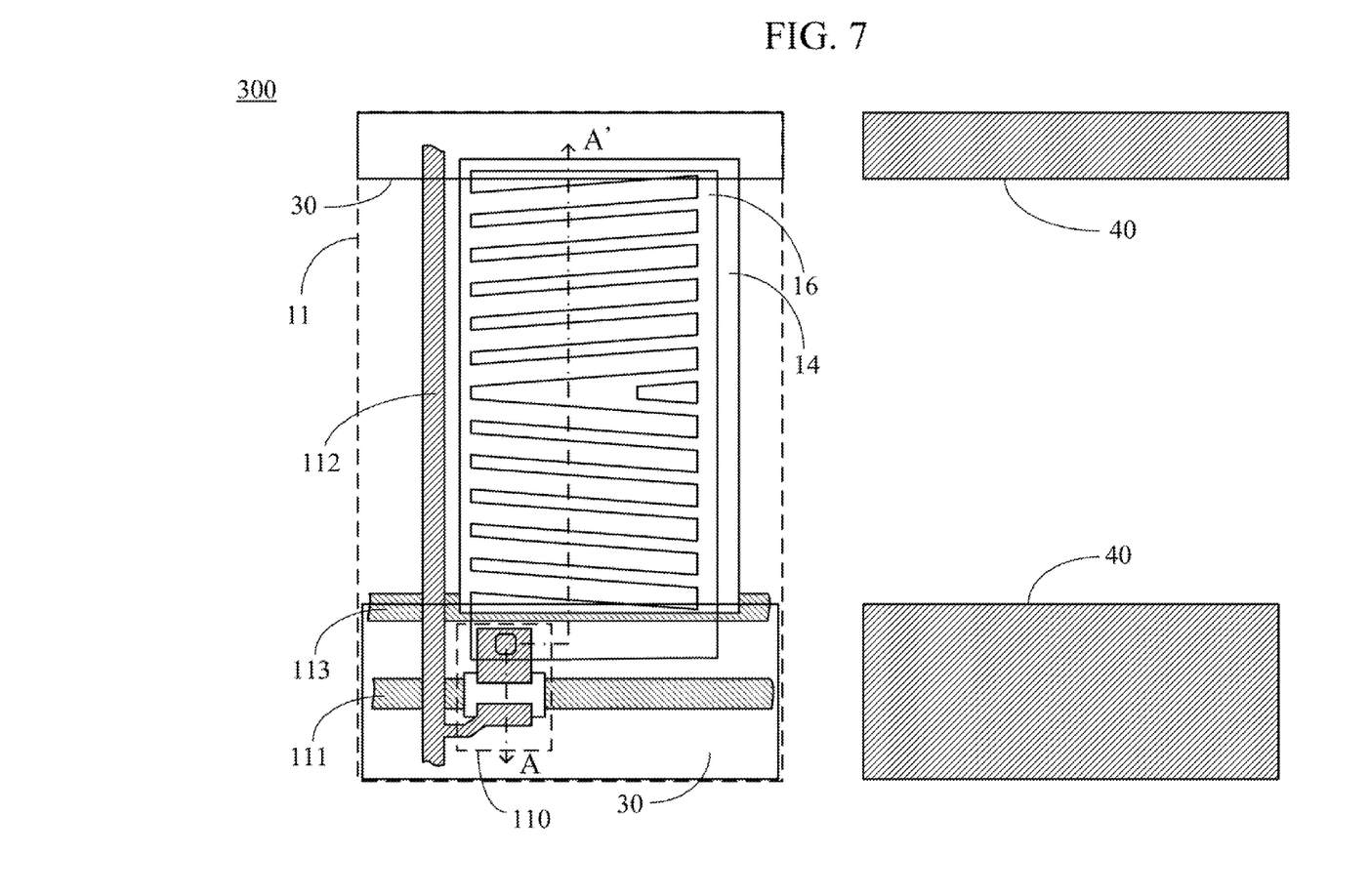
FIG. 7 is a top view schematically illustrating a pixel structure of an FFS mode LCD according to a third preferred embodiment of the present invention.
Figure 8:
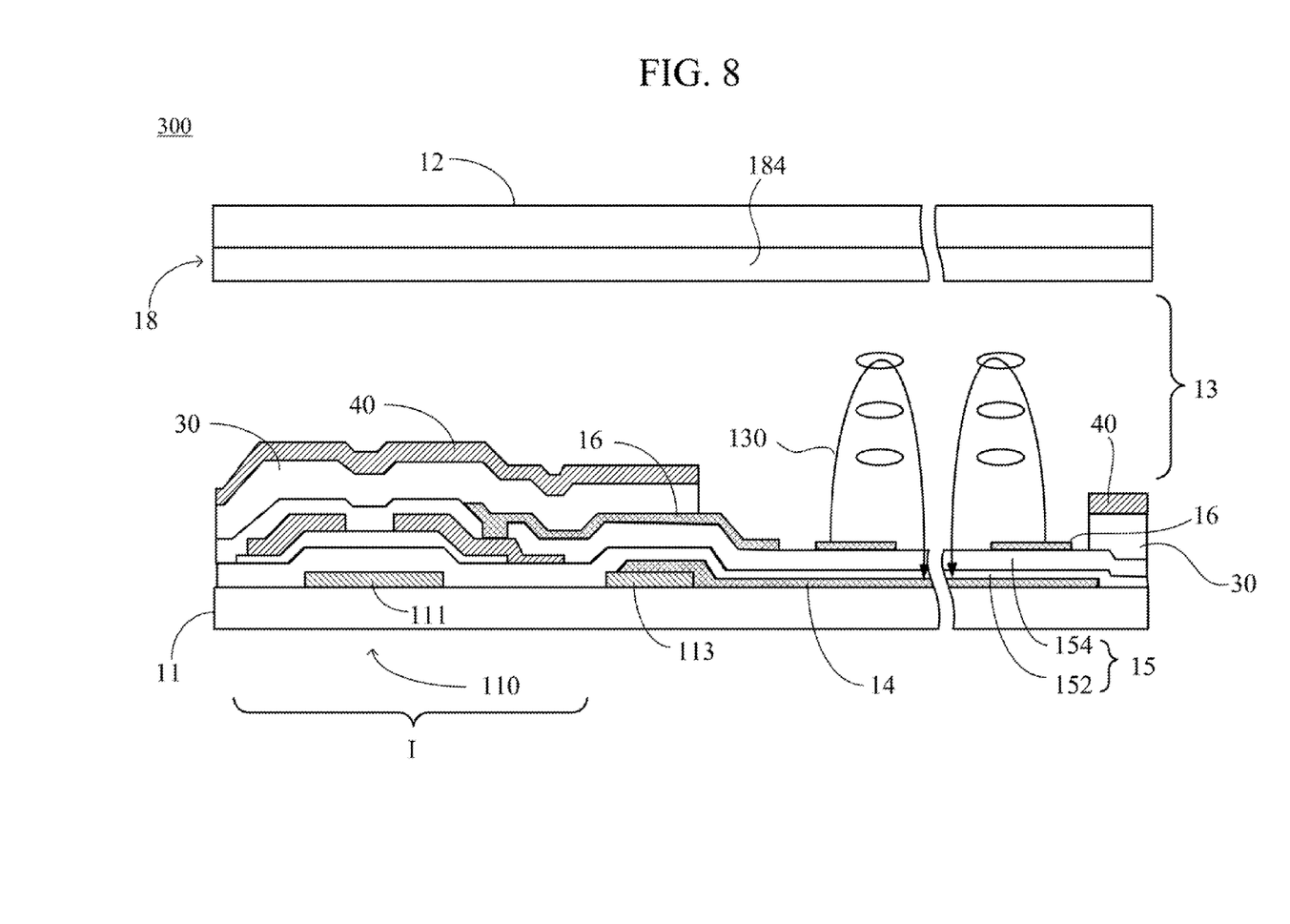
FIG. 8 is a schematic cross-sectional diagram along a line A-A' in FIG. 7.

A third preferred embodiment of the present invention will be explained in the following. The FFS mode LCD of the third preferred embodiment can be a transflective mode LCD. Referring to FIG. 7 and FIG. 8, FIG. 7 is a top view schematically illustrating a pixel structure of an FFS mode LCD according to a third preferred embodiment of the present invention, and FIG. 8 is a schematic cross-sectional diagram along a line A-A' in FIG. 7. The pixel structure of the FFS mode LCD according to the third preferred embodiment of the present invention is designated as a reference numeral 300.

The differences between the third preferred embodiment and the first preferred embodiment are that the pixel structure 300 further includes a patterned reflective layer 40. The patterned reflective layer 40 is disposed on the patterned insulative layer 30. The patterned reflective layer 40 is made of metal, so it can directly shield the light form a backlight. Thus, the shortcoming of the light leakage can be removed completely. Moreover, the patterned reflective layer 40 can reflect the light from outside so as to increase visibility under the sun. Similarly, because the light leakage has been removed, the black matrix 182 on the second substrate can also be removed. In addition, the protective layer 19 in the prior art is not needed to be disposed.

In accordance with the pixel structure of the FFS mode LCD of the present invention, the patterned insulative layer 30 is utilize to confine the fringe field 130 to reduce the disordered electrical field for improving the drawback of the light leakage. In addition, the cover area of the pixel electrode 16 can be increased, so the light leakage resulting from the disordered electrical field can be completely removed, thereby omitting the black matrix. Therefore, the aperture ratio is increased and the production costs are reduced.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. A pixel structure of a fringe field switching (FFS) mode LCD (liquid crystal display), comprising:
a first substrate;
a scan line disposed on the first substrate;
a data line insulatively intersecting the scan line to define a pixel unit;
a thin film transistor (TFT) disposed in an intersection region of the data line and the scan line;
a common electrode disposed in the pixel unit on the first substrate;
a pixel electrode disposed above the common electrode and being insulated from the common electrode, the pixel electrode generating a fringe field corresponding to the common electrode, wherein the TFT and the scan line are covered with the pixel electrode; and
a patterned insulative layer disposed on the scan line and the TFT and exposing the pixel unit, the patterned insulative layer confining the fringe field within the pixel unit, wherein the fringe field in edges of the pixel electrode is pushed inwardly.

2. The pixel structure of claim 1, wherein the pixel electrode is partially covered with the patterned insulative layer.

3. The pixel structure of claim 1, wherein the patterned insulative layer is made of silicon nitride or silicon oxide.

4. The pixel structure of claim 1, further comprising a first alignment film covering the patterned insulative layer and the pixel electrode in the pixel unit.

5. The pixel structure of claim 4, wherein the first alignment film is a photo-alignment film.

6. The pixel structure of claim 1, further comprising a patterned reflective layer disposed on the patterned insulative layer.

7. The pixel structure of claim 6, wherein the patterned reflective layer is made of metal.

8. The pixel structure of claim 1, further comprising a second substrate disposed opposite to the first substrate, and a liquid crystal layer being sandwiched between the first substrate and the second substrate.

9. The pixel structure of claim 8, further comprising a color layer and a second alignment film being sequentially disposed on a side of the second substrate adjacent to the liquid crystal layer.

* * * * *